(12) United States Patent
Chen et al.

(10) Patent No.: US 11,796,153 B2
(45) Date of Patent: Oct. 24, 2023

(54) BACKLIGHT MODULE WITH AN ARRAY OF LIGHT SOURCES WITH A CORRESPONDING NUMBER OF REFLECTIVE UNITS WITH SIDE WALLS

(71) Applicant: AU OPTRONICS CORPORATION, Hsin-Chu (TW)

(72) Inventors: Ming-Lung Chen, Hsin-Chu (TW);
Kun-Cheng Tien, Hsin-Chu (TW);
Yi-Wen Lin, Hsin-Chu (TW);
Cheng-Chuan Chen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 17/826,693

(22) Filed: May 27, 2022

(65) Prior Publication Data

US 2022/0390087 A1     Dec. 8, 2022

(30) Foreign Application Priority Data

Jun. 2, 2021  (TW) ................... 110120053

(51) Int. Cl.
*F21V 7/00*   (2006.01)
*F21V 5/04*   (2006.01)
*F21Y 105/16* (2016.01)

(52) U.S. Cl.
CPC ............ *F21V 7/0058* (2013.01); *F21V 5/045* (2013.01); *F21V 7/0083* (2013.01); *F21Y 2105/16* (2016.08)

(58) Field of Classification Search
CPC .... F21V 7/0058; F21V 7/0066; F21V 7/0083; F21V 7/04; F21V 7/041; F21V 7/043; F21V 7/045; F21V 7/046; F21V 7/048; F21Y 2105/00; F21Y 2105/10; F21Y 2105/12; F21Y 2105/14; F21Y 2105/16; F21Y 2105/18

See application file for complete search history.

(56) References Cited

U.S. PATENT DOCUMENTS

| 7,510,314 | B2 * | 3/2009 | Arai .................. G02F 1/133603 |
| | | | 362/625 |
| 9,194,544 | B2 * | 11/2015 | Ono .......................... F21K 9/60 |
| 10,458,622 | B2 * | 10/2019 | Nakamura ............... G02B 5/09 |
| 2015/0226400 | A1 | 8/2015 | Wada |

FOREIGN PATENT DOCUMENTS

| CN | 202056757 U | 11/2011 |
| CN | 203404650 U | 1/2014 |
| CN | 205979455 U | 2/2017 |
| CN | 208652459 U | 3/2019 |
| CN | 110347051 A | 10/2019 |
| CN | 210639392 U | 5/2020 |
| JP | 2012216762 A | 11/2012 |

* cited by examiner

*Primary Examiner* — Robert J May
(74) *Attorney, Agent, or Firm* — WPAT, P.C

(57) ABSTRACT

A backlight module includes a light source array, a reflector module, and an optical film. The light source array includes a plurality of light sources. The light emitted from the light source can be refracted by the lens unit to obtain a specific light-output angle and uniformity. The reflector module includes a plurality of reflector units. Each reflector unit includes a flat portion, a first wall portion, and a corner wall portion, which have structures and arrangements designed to enable the light source to achieve a display effect of less shadows and better contrast.

19 Claims, 5 Drawing Sheets

BACKLIGHT MODULE WITH AN ARRAY OF LIGHT SOURCES WITH A CORRESPONDING NUMBER OF REFLECTIVE UNITS WITH SIDE WALLS

CROSS-REFERENCE TO RELATED APPLICATION

This application claims the priority benefits of Taiwan application serial no. 110120053, filed on Jun. 2, 2021. The entirety of the mentioned above patent application is hereby incorporated by reference herein and made a part of this specification.

BACKGROUND OF THE INVENTION

1. Field of the Invention

The invention generally relates to a backlight module. Particularly, the invention relates to a backlight module with adjusted light distribution.

2. Description of the Prior Art

The current backlight module technology is roughly divided into two types: direct type and edge type. The direct type technology is to arrange multiple light sources (e.g. light-emitting diodes) in an array and place them on the backside of the diffusion film and the liquid crystal display to provide a backlight with uniform light source brightness. The direct type backlight module has been widely applied to display devices used in home and workplace and is one of the current development trends of liquid crystal display devices. However, taking the light-emitting diode as the light source as an example, due to the optical limitation of the current technology, the improvement of the brightness will cause uneven brightness of the light output from the backlight module.

In order to improve the problem of uneven brightness of the backlight module, the existing technology is to improve the brightness uniformity of the light source of the backlight module through the combination of a multilayer optical film (MOF) and a reflective film. However, such a technology also increases the manufacturing cost and the burden of design and manufacture.

SUMMARY OF THE INVENTION

It is an object of the invention to provide a backlight module, which incorporates the light source array with the reflector module, which is composed of a plurality of reflector units. Each reflector unit has a flat portion, a first wall portion, and a corner wall portion. The structure and the arrangement of the flat portion, the first wall portion, the corner wall portion, and the light source are designed to achieve a display effect with less shadows and better contrast when the light sources emit light. For example, the first wall edge and the corner wall edge can be designed to have different heights with respect to the flat portion, thereby improving the problem that the light in a certain direction is over bright and the light in a certain direction is insufficient.

Specifically, the backlight module includes a light source array and a reflector module. The light source array includes a plurality of light sources, which are arranged along a first direction and a second direction. The reflector module has a plurality of reflector units, which are arranged along the first direction and the second direction and respectively associated with the light sources. Each of the reflector units has a flat portion, a first wall portion, and a corner wall portion. The light source associated with the reflector unit is provided on the flat portion. The first wall portion extends from the flat portion toward the first direction and is elevated relative to the flat portion. The corner wall portion is adjacent to the first wall portion. The corner wall portion extends away from the flat portion in a third direction between the first direction and the second direction to be elevated relative to the flat portion. With respect to the flat portion, a first wall edge of the first wall portion that is away from the flat portion has a first height, and a corner wall edge of the corner wall portion that is away from the flat portion has a second height. The second height is higher than or equal to the first height.

For further understanding of the features and technical content of the invention, please refer to the following detailed descriptions and drawings of the invention. However, the drawings provided are merely for reference and illustration and are not intended to limit the invention.

DETAILED DESCRIPTION OF THE PREFERRED EMBODIMENT

Figure 1:
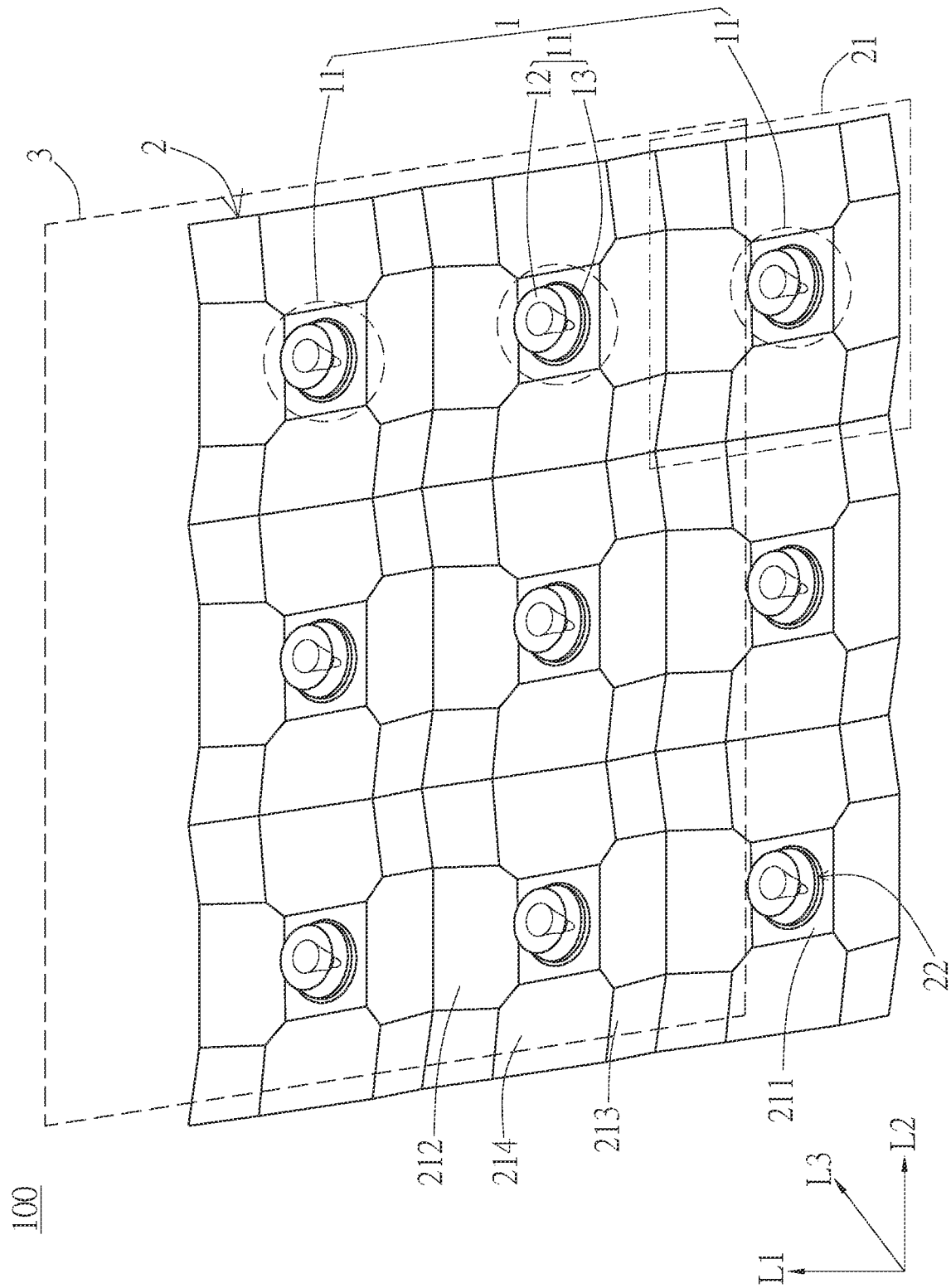
FIG. 1 is a three-dimensional view of the backlight module in an embodiment of the invention.

The embodiments of the light source, the backlight unit, and the backlight module disclosed in the invention will be described below through specific embodiments with reference to FIG. 1 to FIG. 5. Those skilled in the art can understand the advantages and effects of the invention from the content disclosed in this specification. However, the content disclosed below is not intended to limit the scope of the invention. Those skilled in the art can implement the invention with other different embodiments based on different viewpoints and applications without departing from the spirit of the invention.

In the drawings, for the sake of clarity, all shown are simplified schematic diagrams to illustrate the basic structure of the invention. Therefore, the structures shown in the drawings are not drawn according to the actual shape and size ratio. For example, the size of specific elements is exaggerated for clarity. It will be understood that when an element such as a layer, film, region, or substrate is referred to as being "on" or "connected to" another element, it can be directly on or connected to the other element or intervening elements may also be present. In contrast, when an element is referred to as being "directly on" or "directly connected to" another element, there are no intervening elements present. As used herein, "connection" can be referred to physical or electrical connection. Moreover, "electrically connecting" or "coupling" can have other elements between two elements.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Figure 2:
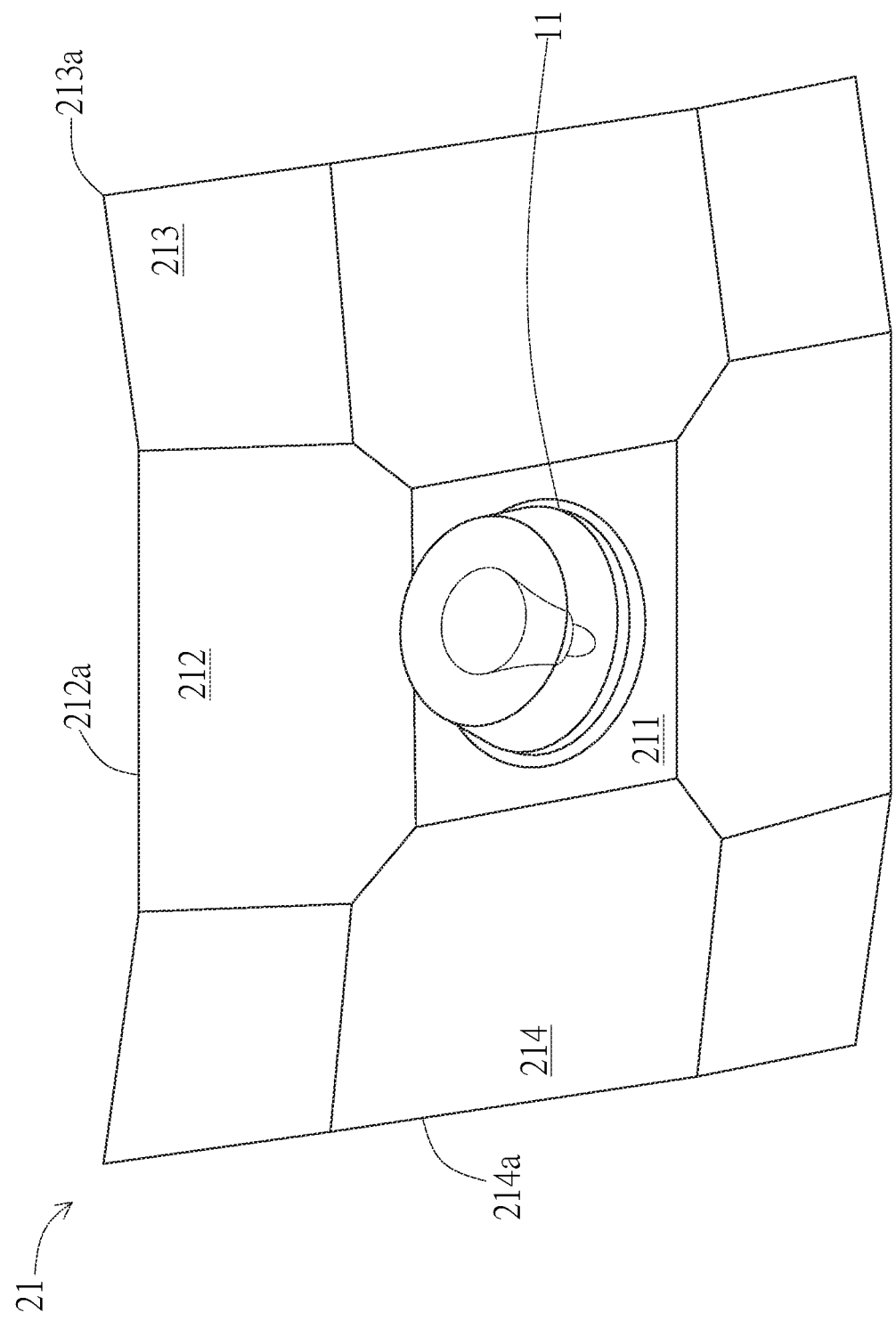
FIG. 2 is a three-dimensional view of the backlight unit in an embodiment of the invention.

Referring to FIG. 1 and FIG. 2, the backlight module 100 in the first embodiment of the invention will be described. The backlight module 100 includes a light source array 1 and a reflector module 2. As shown in FIG. 1, the light source array 1 includes a plurality of light sources 11, and the light sources 11 are arranged along a first direction L1 and a second direction L2. The first direction L1 and the second direction L2 are not parallel to each other and are preferably perpendicular to each other, but not limited thereto. The first direction L1 and the second direction L2 can intersect with each other at an angle other than right angle. In this embodiment, the light source 11 has a light-emitting unit 12 and a lens unit 13. The lens unit 12 can be provided on the light-emitting unit 12. For example, in this embodiment, the light-emitting unit 12 can be a light-emitting diode, and the lens unit 13 can be made of a transparent material (e.g. acrylic) by injection-molding, but not limited thereto.

The reflector module 2 has a plurality of reflector units 21. The plurality of reflector units 21 are arranged along the first direction L1 and the second direction L2 and respectively associated with the light sources 11. In this embodiment, the possible associations include that each light source 11 is disposed on a corresponding reflector unit 21, the light emitted from the light source 11 is mainly reflected from the reflector unit 21, or any suitable structural or optical associations. Each of the reflector units 21 has a flat portion 211, a first wall portion 212, and a corner wall portion 213. The flat portion 211 has an opening 22, and the opening 22 can accommodate the light source 11, thereby connecting the light source 11 with the flat portion 211. In this embodiment, as shown in FIG. 1 and FIG. 2, the light source 11 associated with the reflector unit 21 is inserted into the opening 22 to partially protrude from the flat portion 211.

As described above, in this embodiment, the openings 22 of the reflector units 21 are also arranged along the first direction L1 and the second direction L2. Since the openings 22 are adapted to accommodate the light sources 11, the light sources 11 are arranged parallel to the first direction L1 and the second direction L2 of the reflector module 2. In this embodiment, the flat portion 211 can be designed to have the opening 22 as a through hole for accommodating the light source 11. Alternatively, the flat portion 211 can be designed to have a recessed groove for accommodating the light source 11.

As shown in FIG. 1 and FIG. 2, the first wall portion 212 extends from the flat portion 211 toward the first direction L1 and is elevated relative to the flat portion 211. In other words, the first wall portion 212 is not parallel to the flat portion 211. Specifically, a portion of the first wall portion 212 closer to the flat portion 211 in a direction parallel to the flat portion 211 is also closer to the flat portion 211 in a direction perpendicular to the flat portion 211, and vice versa. As shown in FIG. 1, each reflector unit 21 of the reflector module 2 further includes a second wall portion 214. The second wall portion 214 extends from the flat portion 211 toward the second direction L2 and is elevated relative to the flat portion 211. The second wall portion 214 is not parallel to the flat portion 211. Specifically, a portion of the second wall portion 214 closer to the flat portion 211 in a direction parallel to the flat portion 211 is also closer to the flat portion 211 in a direction perpendicular to the flat portion 211, and vice versa.

As shown in FIG. 1, the corner wall portion 213 is adjacent to the first wall portion 212 and extends away from the flat portion 211 along a third direction L3 between the first direction L1 and the second direction L2 to be elevated relative to the flat portion 211. In other words, the corner wall portion 213 is not parallel to the flat portion 211. Specifically, a portion of the corner wall portion 213 closer to the flat portion 211 in a direction parallel to the flat portion 211 is also closer to the flat portion 211 in a direction perpendicular to the flat portion 211, and vice versa. Two sides of the corner wall portion 213 (e.g. two adjacent sides) are respectively connected to the first wall portion 212 and the second wall portion 214 to jointly partially surround outside the light source 11. In this embodiment, the first wall portion 212 can be located between the adjacent light sources in the first direction L1. The second wall portion 214 can be located between the adjacent light sources 11 in the second direction L2. The corner wall portion 213 can be located between the adjacent light sources 11 in the third direction L3.

From another aspect, for a single reflector unit 21, the first wall portion 212 is provided on the outer side of the flat portion 211 in the forward or reverse direction of the first direction L1. For example, two first wall portions 212 can be provided on two opposite sides of the flat portion 211 in the first direction L1. The second wall portion 214 is provided on the outer side of the flat portion 211 in the forward or reverse direction of the second direction L2. For example, two second wall portions 214 can be provided on two opposite sides of the flat portion 211 in the second direction L2. The corner wall portion 213 is provided on the outer side of the flat portion 211 in the forward or reverse direction of the third direction L3. The third direction L3 is a direction between the first direction L1 and the second direction L2. For example, four corner wall portions 213 can be provided on four corners of the flat portion 211 and respectively between a corresponding pair of the first wall portion 212 and the second wall portion 214. In this embodiment, each of the first wall portion 212 and the second wall portion 214 is connected to one side of the flat portion 211, and the corner wall portion 213 is connected to the first wall portion 212 and the second wall portion 214 and not connected to the flat portion 211, but not limited thereto.

Figure 3:
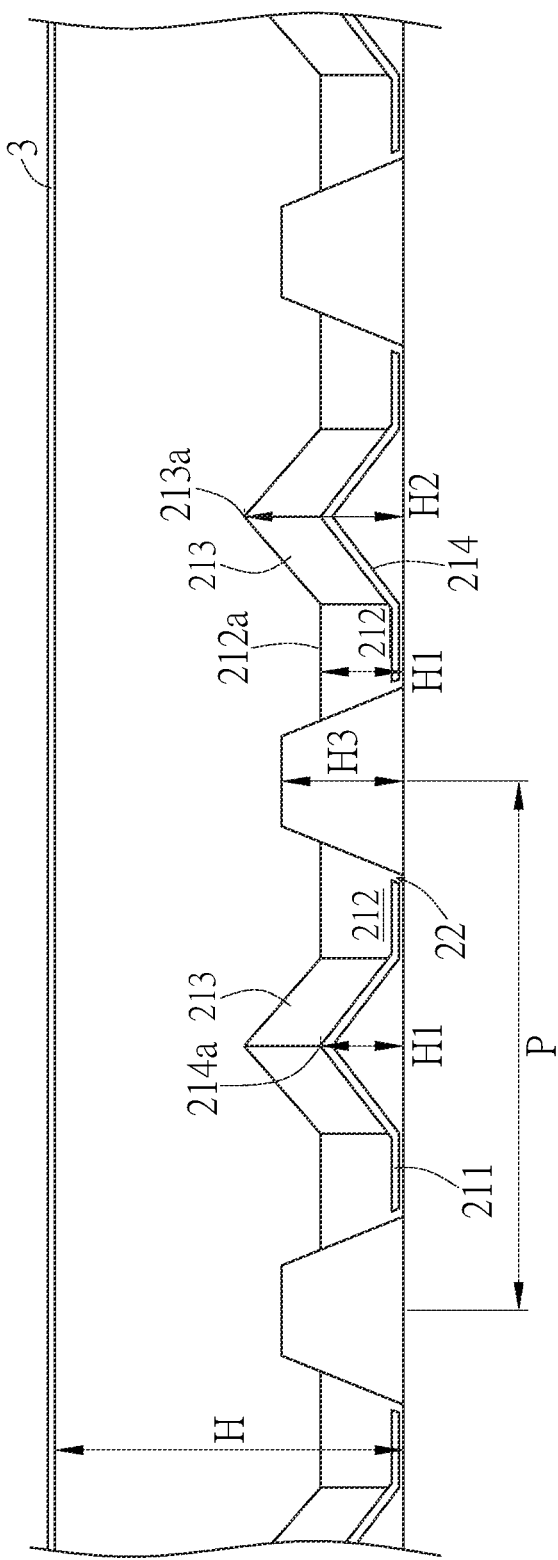
FIG. 3 is a cross-sectional view of the backlight module in an embodiment of the invention.

Also referring to FIG. 3, FIG. 3 is a cross-sectional view of the backlight module 100. With respect to the flat portion 211 (or taking the flat portion 211 as a reference plane), a first wall edge 212a of the first wall portion 212 that is away from the flat portion 211 has a first height H1. With respect to the flat portion 211, a second wall edge 214a of the second wall portion 214 that is away from the flat portion 211 has the first height H1. In this embodiment, the first wall portion 212 and the second wall portion 214 are identical components and have the same first height H1, but not limited thereto. In other embodiments, the first wall portion 212 and the second wall portion 214 can have different heights. In this embodiment, the first wall edge 212a and the second wall edge 214a are referred to edges of the first wall portion 212 and the second wall portion 214 that are away from the flat portion 211, and the first wall edge 212a and the second wall edge 214a are adapted to connect adjacent reflector units 21, respectively.

Furthermore, with respect to the flat portion 211, a corner wall edge 213a of the corner wall portion 213 that is away from the flat portion 211 has a second height H2, and the second height H2 is higher than or equal to the first height H1. The corner wall edge 213a is an outer edge of the corner wall portion 213 that is away from the flat portion 211 and adapted to connect the adjacent reflector units 21. In this embodiment, the corner wall edge 213a includes an outer edge of the corner wall portion 213 that is not connected to the first wall portion 212 and the second wall portion 214, and the second height H2 is preferably the highest height on the entire corner wall edge 213a, such as the height of the top point at the corner. The light source 11 has a third height H3. The second height H2 is higher than or equal to the third height H3, and the third height H3 is higher than or equal to the first height H1. According to the invention, the structure and the arrangement of the flat portion 211, the first wall portion 212, the corner wall portion 213, and the light source 11 are designed to achieve a display effect with less shadows and better contrast when the light sources 11 emit light. Preferably, the first wall portion 212, the corner wall portion 213, and the light source 11 can be designed to have different heights, so when the light sources 11 emit light, a display effect with less shadows and better contrast can be achieved.

The backlight module 100 of the invention further includes an optical film 3. The light source array 1 is provided between the reflector module 2 and the optical film 3. The optical film 3 faces toward the flat portion 211 of the reflector module 2. In an embodiment, the optical film 3 is parallel to the flat portion 211. A light-mixing distance H is between the bottom surface of the optical film 3 and the flat portion 211, and the light-mixing distance H and the second height H2 satisfy the following relationship: $0.4*H \leq H2 \leq 0.8*H$. In addition, the light source 11 has a spacing P from the adjacent light source 11 in the first direction L1 or the second direction L2, the ratio of the light-mixing distance H to the spacing P satisfies the following relationship: $0.125 \leq H/P \leq 0.17$. In a preferred embodiment, the light-mixing distance H is 10 mm to exhibit a better light field. The above ratio values of the light-mixing distance H to the spacing P can be modified based on the characteristics of the light source 11, such as light source model, module design, brightness, as well as the structure and material of the lens unit 13, and the invention is not limited to the specific values.

Figure 4:
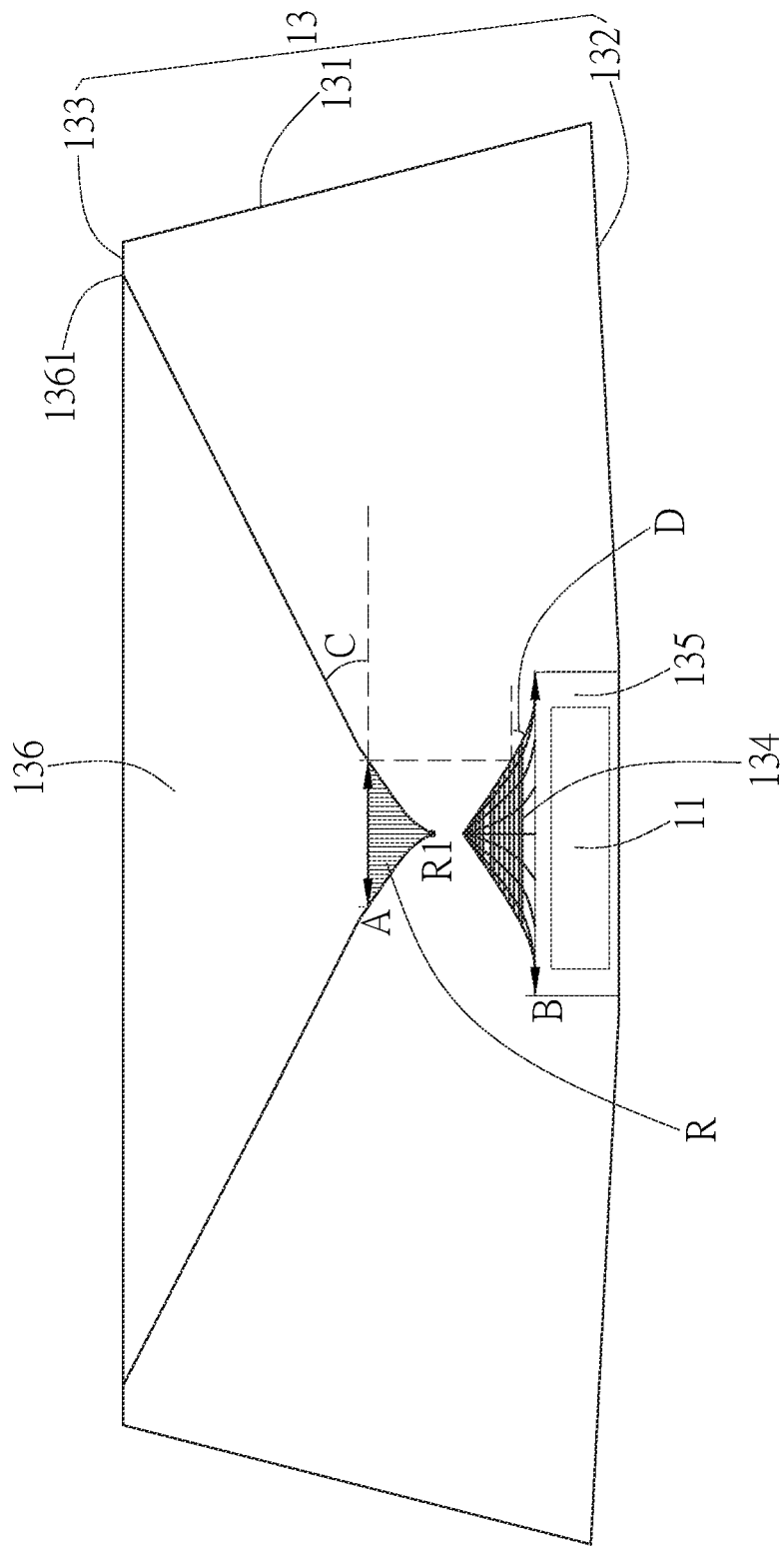
FIG. 4 is a cross-sectional view of the light source in an embodiment of the invention.

Referring to FIG. 4, FIG. 4 is a radial cross-sectional view of the light source 11 in a direction perpendicular to the flat portion in an embodiment of the invention. In this embodiment, the lens unit 13 of the light source 11 further includes a body 131, a lens bottom surface 132, and the lens top surface 133. In this embodiment, the lens bottom surface 132 and the lens top surface 133 both are circular planes. In another embodiment, the lens bottom surface 132 and the lens top surface 133 can both be a hexagonal shape or other polygonal shape. In other embodiments, the lens bottom surface 132 can be a circular shape, and the lens top surface 133 can be a hexagonal shape, or vice versa. The lens top surface 133 is preferably smaller than the lens bottom surface 132. Referring to FIG. 2, from the three-dimensional view, the lens unit 13 can be a column with narrow top and wide bottom. Referring to FIG. 4, the lens unit 13 has a trapezoid cross section.

The lens unit 13 is preferably made of a transparent material, such as plastics or glass. In a different embodiment, the lens unit 13 can be made of a light-transparent material, and the lens unit 13 may contain dopants such as different kinds of particles according to different design needs. For example, the lens unit 13 can be made of a high refractivity and high transmittance material, such as poly methyl methacrylate (PMMA), polycarbonate (PC), so the light emitted from the light source 11 can be refracted by the lens unit 13 to obtain a specific light-output angle and uniformity.

In the embodiment of FIG. 4, the lens bottom surface 132 is at least partially recessed into the body 131 to form a light-input surface 134. The light-input surface 134 encloses an accommodation space 135 for accommodating the light-emitting unit 12. The lens top surface 133 is at least partially recessed into the body 131 to form a light-output surface 136. The light-output surface 136 is opposite to the light-input surface 134. The lens top surface 133 and the lens bottom surface 132 are distinct surfaces which are clearly separated. For example, the lens top surface 133 and the lens bottom surface 132 are substantially distributed in parallel.

A portion of the light-output surface 136 that is convex toward the light-input surface 134 has a rough region R. For example, compared with other regions of the light-output surface 136, the rough region R is densely converged. The distal end of the rough region R forms a tip point R1, and a projection of the rough region R on a plane where the flat portion 211 lies has a first maximum width A. In a virtual radial cross section perpendicular to the flat portion 211, such as the cross section shown in FIG. 4, a connection line of the top edge 1361 of the light-output surface 136 (e.g. the border between the light-output surface 136 and the lens top surface 133) and the edge of the rough region R includes a first angle C with the flat portion 211, and the first angle C is between 29 degrees and 37 degrees. The rough region R has an average roughness (Ra), and the roughness (Ra) satisfies the relationship: $0.3 \text{ μm} \leq Ra \leq 1.5 \text{ μm}$. The rough region R has a material haze (Z), and the material haze (Z) satisfies the relationship: 5% Z 90%.

The projection of the accommodation space 135 on the plane where the flat portion 211 lies has a second maximum width B, and the first maximum width A is less than or equal to the second maximum width B. In the virtual radial cross section, such as the cross section shown in FIG. 4, the connection line of a center of the light-input surface 134 that is convex toward the light-output surface 136 and the projection of the edge of the rough region R on the light-input surface 134 includes a second angle D with the flat portion 211, and the second angle D is larger than or equal to the first angle C. By modifying the design of the light-output surface 136 and the accommodation space 135, the center of the light field can have a desired light uniformity.

Figure 5:
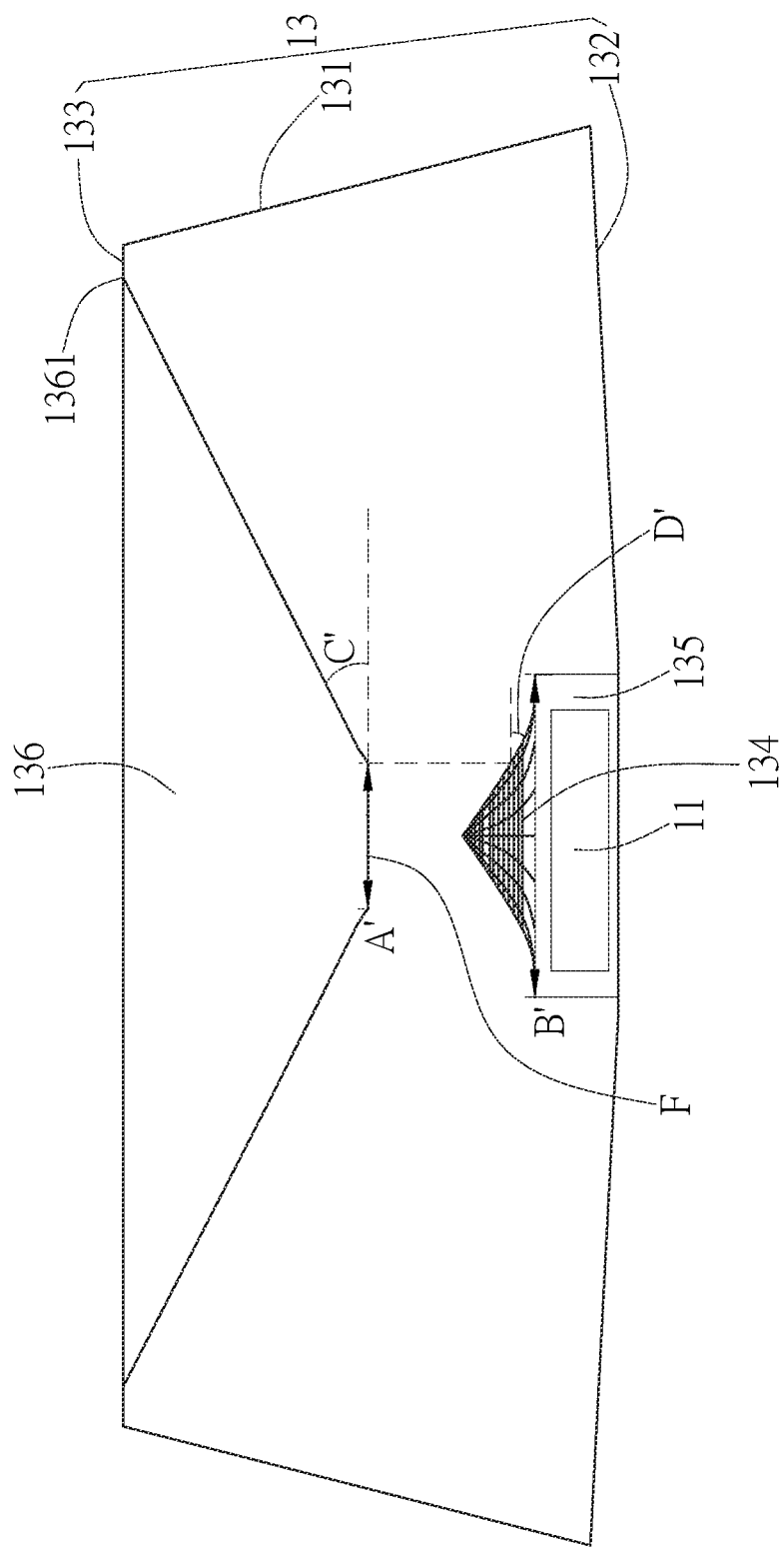
FIG. 5 is a cross-sectional view of the light source in another embodiment of the invention.

Referring to FIG. 5, FIG. 5 shows a cross section of the light source 11 in another embodiment of the invention, which is different from the embodiment of FIG. 4 in that the portion of the light-output surface 136 that is convex toward the light-input surface 134 has a flat region F. The flat region F is parallel to the flat portion 211, and a projection of the flat region F on the plane where the flat portion 211 lies has a third maximum width A'. In the virtual cross section perpendicular to the flat portion 211, such as the cross section shown in FIG. 5, a connection line of the top edge 1361 of the light-output surface 136 (e.g. the border of the light-output surface 136 and the lens top surface 133) and the edge of the flat region F includes a third angle C' with the flat portion 211, and the third angle C' is between 33 degrees and 45 degrees. In this embodiment, the flat region F can be a planar surface or a curved surface having an angle less than or equal to 20 degrees included between the tangent line of the edge of the flat region F and the flat portion 211. In other words, the angle included between a virtual tangent plane at any point of the flat region F and the flat portion 211 is preferably less than or equal to 20 degrees.

The projection of the accommodation space 135 on the plane where the flat portion 211 lies has a fourth maximum width B', and the third maximum width A' is less than or equal to the fourth maximum width B'. In the virtual cross section shown in FIG. 5, the connection line of the center of the light-input surface 134 that is convex toward the light-output surface 136 and the projection of the edge of the flat region F on the light-input surface 134 includes a fourth angle D' with the flat portion, and the fourth angle D' is larger than or equal to the third angle C'. By modifying the design of the light-output surface 136 and the accommodation space 135, the center of the light filed can have a desired light uniformity.

According to the above embodiments, the light source, the backlight unit, and the backlight module will provide the display effect of less shadows and better contrast. Such a display effect can improve the overall display uniformity and quality, thereby enhancing the user or viewer experience or effect.

Although the preferred embodiments of the invention have been described herein, the above description is merely illustrative. The preferred embodiments disclosed will not limit the scope of the invention. Further modification of the invention herein disclosed will occur to those skilled in the respective arts and all such modifications are deemed to be within the scope of the invention as defined by the appended claims.

What is claimed is:

1. A backlight module, comprising:
    a light source array comprising a plurality of light sources arranged along a first direction and a second direction; and
    a reflector module having a plurality of reflector units arranged along the first direction and the second direction and respectively associated with the light sources, each of the reflector units having:
        a flat portion, wherein the light source associated with the reflector unit is provided on the flat portion;
        a first wall portion extending from the flat portion toward the first direction and being elevated relative to the flat portion;
        a corner wall portion adjacent to the first wall portion, the corner wall portion extending away from the flat portion in a third direction between the first direction and the second direction to be elevated relative to the flat portion,
    wherein with respect to the flat portion, a first wall edge of the first wall portion away from the flat portion has a first height, and a corner wall edge of the corner wall portion away from the flat portion has a second height higher than or equal to the first height,
    wherein the light source has a light-emitting unit and a lens unit, and the lens unit further comprises:
        a body;
        a lens bottom surface at least partially recessed into the body to form a light-input surface, the light-input surface enclosing an accommodation space for accommodating the light-emitting unit; and
        a lens top surface at least partially recessed into the body to form a light-output surface opposite to the light-input surface,
    wherein a portion of the light-output surface convex toward the light-input surface has a flat region parallel to the flat portion; a projection of the flat region on a plane where the flat portion lies has a third maximum width; a projection of the accommodation space on the plane where the flat portion lies has a fourth maximum width; the third maximum width is less than or equal to the fourth maximum width.

2. The backlight module of claim 1, wherein the flat portion has an opening for accommodating the light source in the opening.

3. The backlight module of claim 1, further comprising an optical film,
    wherein the light source array is provided between the reflector module and the optical film, the optical film faces toward the flat portion, and the optical film is parallel to the flat portion;
    wherein a light-mixing distance is between a bottom surface of the optical film and the flat portion, and the following relationship is satisfied:

$$0.4*H \leq H2 \leq 0.8*H;$$

wherein H is the light-mixing distance, and H2 is the second height.

4. The backlight module of claim 3, wherein each of the light sources has a spacing from another light source adjacent in the first direction, and a ratio of the light-mixing distance to the spacing satisfies the following relationship:

$$0.125 \leq H/P \leq 0.17;$$

wherein H is the light-mixing distance, and P is the spacing.

5. The backlight module of claim 1, wherein at least part of the corner wall portion is located between two adjacent light sources of the light sources in the third direction.

6. The backlight module of claim 1, wherein in a virtual radial cross section perpendicular to the flat portion, a connection line of a top edge of the light-output surface and an edge of the flat region includes a third angle with the flat portion, and the third angle is between 33 degrees and 45 degrees.

7. The backlight module of claim 6, wherein in the virtual radial cross section, a connection line of a center of the light-input surface convex toward the light-output surface and a projection of the edge of the flat region on the light-input surface includes a fourth angle with the flat portion, and the fourth angle is larger than or equal to the third angle.

8. The backlight module of claim 1, wherein an angle included between a virtual tangent plane at any point of the flat region and the flat portion is less than or equal to 20 degrees.

9. The backlight module of claim 1, wherein the reflector unit further comprises a second wall portion extending from the flat portion toward the second direction and being elevated relative to the flat portion; the corner wall portion has two adjacent sides respectively connected to the first wall portion and the second wall portion.

10. A backlight module, comprising:
    an optical film;
    a light source array comprising a plurality of light sources arranged along a first direction and a second direction; and
    a reflector module having a plurality of reflector units arranged along the first direction and the second direction and respectively associated with the light sources, each of the reflector units having:
        a flat portion, wherein the light source associated with the reflector unit is provided on the flat portion;
        a first wall portion extending from the flat portion toward the first direction and being elevated relative to the flat portion; and
        a corner wall portion adjacent to the first wall portion, the corner wall portion extending away from the flat portion in a third direction between the first direction and the second direction to be elevated relative to the flat portion, wherein with respect to the flat portion, a first wall edge of the first wall portion away from the flat portion has a first height, and a corner wall edge of the corner wall portion away from the flat portion has a second height higher than or equal to the first height;

wherein the light source array is provided between the reflector module and the optical film, the optical film faces toward the flat portion, and the optical film is parallel to the flat portion;

wherein a light-mixing distance is between a bottom surface of the optical film and the flat portion, and the following relationship is satisfied:

$$0.4*H \leq H2 \leq 0.8*H;$$

wherein H is the light-mixing distance, and H2 is the second height.

11. The backlight module of claim 10, wherein the light source has a light-emitting unit and a lens unit provided on the light-emitting unit.

12. The backlight module of claim 10, wherein the reflector unit further comprises a second wall portion, and the second wall portion extends from the flat portion toward the second direction and is elevated relative to the flat portion.

13. The backlight module of claim 10, wherein each of the light sources has a spacing from another light source adjacent in the first direction, and a ratio of the light-mixing distance to the spacing satisfies the following relationship:

$$0.125 \leq H/P \leq 0.17;$$

wherein H is the light-mixing distance, and P is the spacing.

14. A backlight module, comprising:
a light source array comprising a plurality of light sources arranged along a first direction and a second direction; and
a reflector module having a plurality of reflector units arranged along the first direction and the second direction and respectively associated with the light sources, each of the reflector units having:
 a flat portion, wherein the light source associated with the reflector unit is provided on the flat portion;
 a first wall portion extending from the flat portion toward the first direction and being elevated relative to the flat portion; and
 a corner wall portion adjacent to the first wall portion, the corner wall portion extending away from the flat portion in a third direction between the first direction and the second direction to be elevated relative to the flat portion, wherein with respect to the flat portion, a first wall edge of the first wall portion away from the flat portion has a first height, and a corner wall edge of the corner wall portion away from the flat portion has a second height higher than or equal to the first height;

wherein the light source has a light-emitting unit and a lens unit, and the lens unit further comprises:
 a body;
 a lens bottom surface at least partially recessed into the body to form a light-input surface, the light-input surface enclosing an accommodation space for accommodating the light-emitting unit; and
 a lens top surface at least partially recessed into the body to form a light-output surface opposite to the light-input surface, wherein a portion of the light-output surface convex toward the light-input surface has a rough region; a projection of the rough region on a plane where the flat portion lies has a first maximum width; a projection of the accommodation space on the plane where the flat portion lies has a second maximum width; the first maximum width is less than or equal to the second maximum width.

15. The backlight module of claim 14, wherein in a virtual radial cross section perpendicular to the flat portion, a connection line of a top edge of the light-output surface and an edge of the rough region includes a first angle with the flat portion, and the first angle is between 29 degrees and 37 degrees.

16. The backlight module of claim 15, wherein in the virtual radial cross section, a connection line of a center of the light-input surface convex toward the light-output surface and a projection of the edge of the rough region on the light-input surface includes a second angle with the flat portion, and the second angle is larger than or equal to the first angle.

17. The backlight module of claim 14, wherein the reflector unit further comprises a second wall portion extending from the flat portion toward the second direction and being elevated relative to the flat portion; the corner wall portion has two adjacent sides respectively connected to the first wall portion and the second wall portion.

18. The backlight module of claim 14, wherein the rough region has an average roughness (Ra), and the roughness (Ra) satisfies the following relationship: $0.3\ \mu m \leq Ra \leq 1.5\ \mu m$.

19. The backlight module of claim 14, wherein the rough region has a material haze (Z), and the material haze (Z) satisfies the following relationship: $5\% \leq Z \leq 90\%$.

* * * * *